United States Patent
Dillingham

(10) Patent No.: US 7,037,034 B2
(45) Date of Patent: May 2, 2006

(54) SAFETY DOOR SYSTEM AND METHOD FOR A HOPPER BODY

(75) Inventor: Harold Dillingham, Jacksonville, TX (US)

(73) Assignee: H.D. Industries, Inc., Jacksonville, TX (US)

( * ) Notice: Subject to any disclaimer, the term of this patent is extended or adjusted under 35 U.S.C. 154(b) by 99 days.

(21) Appl. No.: 10/750,033

(22) Filed: Dec. 31, 2003

(65) Prior Publication Data

US 2005/0169706 A1 Aug. 4, 2005

(51) Int. Cl.
*B60P 7/02* (2006.01)

(52) U.S. Cl. .................... 404/84.05; 404/110; 298/24; 298/25; 298/29; 296/100.1

(58) Field of Classification Search ............ 404/84.05, 404/108, 110; 298/24, 25, 29; 296/100.1
See application file for complete search history.

(56) References Cited

U.S. PATENT DOCUMENTS

| | | | | |
|---|---|---|---|---|
| 4,695,186 | A | * | 9/1987 | King .......................... 404/111 |
| 5,120,217 | A | * | 6/1992 | O'Brien et al. ............. 432/120 |
| 5,131,788 | A | * | 7/1992 | Hulicsko .................... 404/108 |
| 5,960,710 | A | * | 10/1999 | Holtom ...................... 100/343 |
| 5,988,935 | A | | 11/1999 | Dillingham ................. 404/79 |

OTHER PUBLICATIONS

Product Literature "Features," "Specifications," and "Options," 8 pp., obtained Oct. 8, 2003 at website: www.pro-patch.cm; of H.D Industries, Inc., Jacksonville, TX.

* cited by examiner

*Primary Examiner*—Gary S. Hartmann
(74) *Attorney, Agent, or Firm*—Stephen S. Mosher

(57) ABSTRACT

Accordingly there is disclosed a safety door system, comprising a hopper body containing a powered implement powered by a hydraulic control system, for dispensing liquid or granular materials or for agitating the liquid or granular materials; a safety door for covering and preventing access into the hopper body during use; a hydraulic actuating cylinder operative to open the safety door; and an interlock device coupled between the hydraulic actuating cylinder and the hydraulic control system such that the powered implement within the hopper body is prevented from operating whenever the safety door is not in its closed position.

In another embodiment there is disclosed a method of limiting access to a hopper body of a mobile pavement repair system during its use, the hopper body having a powered implement within the hopper body and powered by a hydraulic motor. The method comprises the steps of covering the open top of the hopper body with a safety door; opening and closing the safety door using a hydraulic actuating cylinder; and preventing the powered implement from operating whenever the safety door is not in its closed position, under the control of an interlock device coupled between the hydraulic actuating cylinder and the hydraulic motor.

18 Claims, 4 Drawing Sheets

SAFETY DOOR SYSTEM AND METHOD FOR A HOPPER BODY

BACKGROUND OF THE INVENTION

1. Field of the Invention

The present invention generally relates to hopper containers for dispensing viscous liquid or granular materials and, more particularly, to safety door systems for hopper containers as may be used in such applications as pavement construction or repair or in agricultural uses.

2. Description of the Prior Art

Containers that hold and dispense viscous liquid or granular materials for use in pavement construction or repair or agricultural applications are well known in the art. Such containers may be called hopper bodies and be used in stationary or mobile equipment. Some hopper bodies typically include one or more rotating implements in the interior of the hopper for stirring, agitating or facilitating the dispensing of the material from the hopper, usually from an opening disposed in the lower portion of the hopper. For example, hopper bodies used in asphalt pavement repair vehicles are described in U.S. Pat. No. 5,988,935, issued Nov. 23, 1999 and assigned to the assignee of the present invention. This patent is hereby incorporated by reference into this specification in its entirety.

The hopper bodies of asphalt pavement repair vehicles may be large enough to contain up to four cubic yards, or more, of material. The material may be heated to prepare it for use and agitated by a paddle shaft mechanism to maintain a uniform consistency and temperature. Further, during dispensing of the material, an auger used as a screw conveyor may be used to facilitate the dispensing process. Both the paddle shaft and the screw conveyor may be rotating mechanisms powered by hydraulic motors, for example. In some situations of use, the material in the hopper body may become too viscous or tend to clog the rotating mechanisms during a mixing or dispensing operation. In these or similar situations, operating personnel may be tempted to climb inside the hopper body to attempt to clear a blockage or to manually assist the paddle shaft or screw conveyor in stirring or conveying the material. This is an extremely dangerous activity because it exposes the operating personnel to the risk of serious injury by the rotating implements within the hopper body.

What is needed is a system or method for ensuring that operating personnel are prevented from entering the hopper body while the rotating equipment is operating. Further, even if a worker enters the hopper body for some reason, a system or method is needed for stopping the operation of the rotating machinery or any other moving device within the hopper body to minimize the risk of injury to the person.

SUMMARY OF THE INVENTION

Accordingly there is disclosed a safety door system for a hopper body containing a rotating implement powered by a hydraulic control system. The hopper body for transporting liquid or granular material, which has a V-shaped floor to facilitate dispensing the material, further includes the rotating implement for dispensing the liquid or granular materials from an opening in the hopper body and/or for agitating the liquid or granular materials. A safety door, provided for covering and preventing access into the hopper body during use, is hinged along a first edge to a corresponding first side of the hopper body and moveable between a closed and an open position when a hydraulic actuating cylinder, coupled between a second edge of the safety door and a corresponding second side of the hopper body, opens the safety door when the hydraulic actuating cylinder extends its length and closes the door when the hydraulic actuating cylinder retracts its length. An interlock device coupled between the hydraulic actuating cylinder and the hydraulic control system prevents the rotating implement within the hopper body from rotating whenever the safety door is not in its closed position.

In another embodiment there is disclosed a method of limiting access to a hopper body of a mobile pavement repair system during its use, the hopper body having an open top and a V-shaped floor, for transporting liquid or granular materials, and a rotating implement disposed within the hopper body and powered by a hydraulic motor in a hydraulic control system. The method comprises the steps of: covering the open top of the hopper body with a safety door, hinged along a first edge to a corresponding first side of the hopper body and operable between a closed and an open position; opening and closing the safety door using a hydraulic actuating cylinder, the hydraulic actuating cylinder coupling the safety door from a second edge thereof to a corresponding second side of the hopper body, wherein the hydraulic actuating cylinder extends its length to open the safety door and retracts its length to close the safety door; and preventing the rotating implement from rotating, whenever the safety door is not in its closed position, under the control of an interlock device coupled between the hydraulic actuating cylinder and the hydraulic motor.

DETAILED DESCRIPTION OF THE INVENTION

Figure 1:
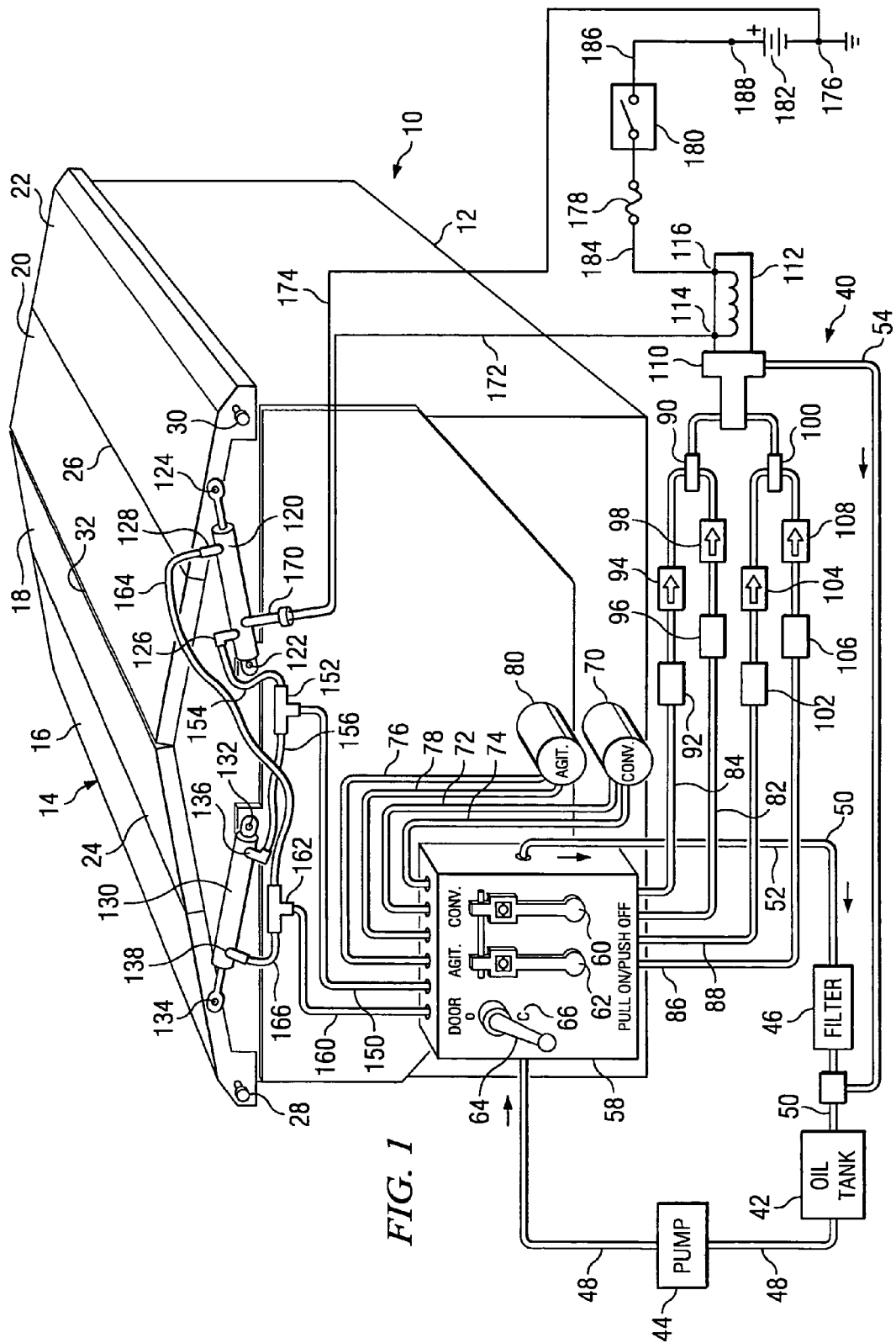
FIG. 1 illustrates a hopper body system for storing and dispensing liquid or granular materials equipped with one embodiment of a safety door system according to the present invention.

Referring to FIG. 1, there is illustrated a hopper body system 10, e.g., for storing and dispensing viscous liquid or granular materials equipped with one embodiment of a safety door system according to the present invention. A hopper body 12, which includes a powered implement (See, e.g., FIG. 4) that rotates or moves in other directions, includes a safety door 14 for covering an open top of the hopper body 12. The powered or rotating implement may, for example be a conveyor of the belt type or auger type. The hopper body 12 is typically rectangular in shape, may be fabricated of welded steel panels, or other suitable materials considering the materials to be transported or stored. In some applications the hopper body may be round or conform to some other shape. Mobile versions of the hopper body 12 may be adapted for mounting upon the chassis of a truck, or upon a trailer that could be towed by a truck or other vehicle. Stationary versions of the hopper body may be supported on a suitable frame, which typically elevates the hopper body for positioning a mobile unit below the hopper body when dispensing material from the hopper body into the mobile unit.

The safety door 14 shown in FIG. 1 may be fabricated of sheet metal or synthetic materials and configured as a pair of bifold doors as will be described herein below. A first bifold door of the safety door 14 includes first and second door panels 16, 18, which are hinged together along the joint 24. A second bifold door of the safety door 14 includes third and fourth door panels 20, 22, which are hinged along the joint 26. In the illustrative example, the pair of bifold doors (16, 18 and 20, 22), when closed, meet along a junction 32. The first panel 16 of the first bifold door 16, 18 is attached along a first edge thereof to a corresponding first side of the hopper 12 via a hinge (not shown) disposed along an axis indicated by a first tie pin 28. The fourth panel 22 of the second bifold door 20, 22 is attached along a second edge thereof to a corresponding second side of the hopper 12 via a hinge (not shown) disposed along an axis indicated by a second tie pin 30. The tie pins 28, 30, which are aligned with the hinge axes and protrude from the end of the hopper body 12, may be provided for securing a tarpaulin or for temporarily suspending lamps or other tools.

Although the illustrated embodiment of the safety door 14 is configured as a pair of bifold door panels, to cover a relatively large hopper body having a width of approximately six feet and a length of, e.g., six to twelve feet, a safety door 14 of the present invention could also be configured as a single panel door, or a pair of half-size door panels, etc., to cover a hopper of smaller dimensions or a different shape, without departing from the principles of the present invention. It is contemplated that different specific applications will suggest, to persons skilled in the art, variations in the door panel configuration and construction that is selected.

In one embodiment, the hopper body 12 may be configured for holding, transporting and dispensing asphalt mix paving materials, as disclosed in U.S. Pat. No. 5,988,935 and assigned to the assignee of the present invention, for repairing pavement damage such as potholes. The hopper body 12 may thus include mechanisms for heating the asphalt mix materials to an appropriate temperature and viscosity and structural features for insulating the walls of the hopper body 12 to retain the heat within the material inside the hopper body 12. In other applications of a hopper body 12, e.g., for holding, transporting and dispensing various materials used in road or building construction or agricultural materials for seeding or soil conditioning, the hopper body 12 may be equipped with other apparatus suited to the specific application. In such examples, a safety door system according to the present invention would serve the same purpose—the protection of operating personnel from serious risk of injury during operation or servicing of the hopper body system 10. Further, as mentioned previously, it is contemplated that the safety door system lends itself as well to stationary as to mobile applications.

Superimposed over the outline drawing of the hopper body 12 in FIG. 1 is a schematic pictorial diagram of the portion of the hydraulic control system 40 involved in the operation of the safety door system of the present invention. Structures of the hydraulic control system 40 in FIG. 1 are not necessarily shown in their actual locations. The double lines in the drawing represent hydraulic fluid (oil) lines and the single lines represent electrical conductors. The hydraulic oil stored in an oil tank 42 is circulated in the direction of the arrows by pump 44 through oil line 48, a stack valve 58, an oil return line 50 and the various other lines as will be described. Returning oil, except for oil diverted by the solenoid-operated safety dump valve 110 (which flows along path 54 to return to the oil tank 42), is filtered by filter 46 and follows oil return line 50 back to the oil tank 42. Oil return from the safety dump valve 110 is unfiltered in order to remove any restriction to the flow of oil, which may impair the response of the safety door system to the opening of the safety doors 14. Control of the flow of oil to various parts of the safety door system is provided by the stack valve 58.

The stack valve 58 is a system of valves and oil distribution ports, typically configured as a single, composite structure having a plurality of valves and ports, for controlling the flow of oil to operate the various components, including powered implements, connected in the hydraulic system. In the illustrative example the valves are operated by hand levers, coupled to the stack valve 58 by operating rods (not shown) typically moveable between ON and OFF, or FORWARD and REVERSE positions. In some applications the levers may include an intermediate 'NEUTRAL' position. In other applications, the levers might be replaced by electric solenoids connected to control rods and operated from a remote position with respect to the device(s) being controlled.

Continuing with FIG. 1, the stack valve 58 in the illustrated embodiment includes a control lever 60 for operating a screw conveyor motor 70, a control lever 62 for operating an agitator motor 80, and a control lever 64 for operating the safety door 14. The control lever 64 is moveable between a 'CLOSED' position, indicated by the letter "C"(Ref. No. 66) and an OPEN position indicated by the letter "O." The levers 60, 62 in the illustrated embodiment are operable between FORWARD, NEUTRAL, and REVERSE positions. In some applications the three positions may be LOW, OFF, and HIGH speeds, for example. Hydraulically operated conveyor motor 70, connected to the stack valve 58 via oil supply line 72 and oil return line 74, functions to rotate a screw conveyor (auger) in the hopper body. Hydraulically operated (paddle shaft) agitator motor 80, connected to the stack valve 58 via oil supply line 76 and oil return line 78, functions to rotate a paddle shaft and thereby control the rotation of the agitating paddles. The screw conveyor and paddle shaft will be described further in the description for FIG. 4.

Before continuing with FIG. 1, several other types of hydraulic system components used in the safety door system of the present invention will be described. These components include: an unloader valve (92, 96, 102, and 106); a check valve (94, 98, 104, and 108); a normally open dump safety valve (110); and a proximity switch (170).

An unloader valve (92, 96, 102, and 106) is normally open to allow oil to flow through it, if there is any flow at all in the line in which it is installed. In the illustrated embodiment, the unloader valves are installed in bypass lines of a pilot control circuit that is controlled by a dump safety valve 110. If the dump safety valve 110 opens under a condition in which oil must be diverted from a normal function and returned to the oil supply reservoir (oil tank 42), the unloader valve acts to unload the pilot control oil supply circuit to the component being supplied. This action prevents the operation of the component supplied by the protected oil line.

A check valve (94, 98, 104, and 108) is a one-way poppet valve that allows oil to flow through the oil line in one direction only. The check valve closes if the oil pressure in the line reverses direction. It is used, in the present invention, to maintain oil flow in one direction only—toward the oil tank and away from the pump.

A normally open dump safety valve (110) is held closed by the action of an energized solenoid coil. When installed in a bypass circuit, a closed dump safety valve prevents the operation of the bypass circuit. When the solenoid drops out, i.e, releases, the dump safety valve opens and allows the oil supply to flow from the unloader valves through the bypass circuit to return to the reservoir.

A proximity switch (170) is used to sense the change in the proximity of a nearby movable component to a sensing element in the switch. In one configuration of the present invention a set of contacts in the proximity switch, closed when the nearby component is in proximity, open with the loss of proximity. These contacts, when connected in the operating circuit of a solenoid coil in the dump safety valve, cause the solenoid coil to release when the proximity is lost. Release of the solenoid coil opens the dump safety valve, which opens the unloader valves and diverts the oil supply for the conveyor and agitator motors back to the oil tank.

Continuing with FIG. 1, a bypass circuit (See the enlarged view of the bypass circuit 190 shown in FIG. 3) in the hydraulic control system 40 is controlled by a normally open dump safety valve 110. The bypass circuit includes bypass oil lines that divert the pilot control oil for both the conveyor motor 70 and the agitator motor 80 back to the oil tank 42 whenever the safety door 14 begins to open. The bypass circuit for the conveyor motor 70 includes two branch circuits: a first oil line 82, an unloader valve 96 connected between the stack valve 58 and a first branch of a tee fitting 90, which is connected to a first entry branch of the dump safety valve 110; and a second oil line 84, an unloader valve 92 connected between the stack valve 58 and a second branch of a tee fitting 90, which is connected to the first entry port of the dump safety valve 110. Similarly, the bypass circuit for the agitator motor 80 includes two branch circuits: a third oil line 86, an unloader valve 106 connected between the stack valve 58 and a first branch of a tee fitting 100, which is connected a second entry port of the dump safety valve 110; and a fourth oil line 88, an unloader valve 102 connected between the stack valve 58 and a second branch of a tee fitting 100, which is connected to the second entry port of the dump safety valve 110. Persons skilled in the art will realize that not every hydraulic circuit in a machine that may be used in a hopper body will require an associated bypass circuit—only those circuits that may pose a hazard to persons in the proximity thereto or which may require bypass circuits for other operational reasons.

In one embodiment of a stack valve 58 as used in the present invention, the unloader valves 92, 96, 102 and 196 are installed in respective auxiliary option ports of the stack valve 58. Thus, pilot control oil line 84 is associated in the stack valve 58 with oil line 74 and pilot control oil line 82 is associated with oil line 72. Similarly, pilot control oil line 88 is associated in the stack valve 58 with oil line 78 and pilot control oil line 86 is associated with oil line 76. Further, an outlet port of the dump safety valve 110 is connected to a return oil line 54, which returns oil diverted by the dump safety valve 110 to the oil tank 42. Electric current for operating the solenoid coil 112 of the dump safety valve 110 is connected to the solenoid coil 112 via terminals 114, 116, as will be described herein below.

Included in the pictorial schematic of the hydraulic control system 40 in FIG. 1 are hydraulic actuating cylinders and associated components for opening and closing the door panels and providing the safety interlock functions of the door safety system of the present invention. As used in the illustrative embodiment, a hydraulic actuating cylinder is a linear actuator having a sealed tubular cylinder and a movable rod protruding from one end that may be extended from or retracted within the one end of the tubular cylinder. As oil is pumped into one end or the other end of the tubular cylinder, the movable rod, attached to a piston at the end of the rod inside the tubular cylinder, extends or retracts the overall length of the hydraulic actuating cylinder.

A first hydraulic actuating cylinder 120 (which will also be referred to as an 'actuator 120') is connected between a first pin 122 on the side of an upper portion of the hopper body and a second pin 124 on a first edge of the door panel 22. As oil is pumped into the actuator 120 it increases in length and causes the door panel 22 to swing upward from the hopper body 12 about the hinge axis 30. When door panel 22 pivots upward, the door panel 20, which is hinged to the door panel 22 along the joint 26, is lifted away from the hopper body 12. The free edge of the bifold door 20, 22 slides along the upper rim of the hopper body 12 as it is opened. Similarly, a second hydraulic actuating cylinder 130 (which will also be referred to as an 'actuator 130') is connected between a third pin 132 on the side of an upper portion of the hopper body and a fourth pin 134 on a first edge of the door panel 16. As oil is pumped into the actuator 130 it increases in length and causes the door panel 16 to swing upward from the hopper body 12 about the hinge axis 28. When door panel 16 pivots upward, the door panel 18, which is hinged to the door panel 16 along the joint 24, is lifted away from the hopper body 12. The free edge of the bifold door 16, 18 slides along the upper rim of the hopper body 12 as it is opened.

The actuators 120, 130 may be extended together via a common 'open' oil line 150 and retracted via a common 'close' oil line 160, both of which are connected at a supply end of the respective oil lines 150, 160 to the stack valve 58. The opposite end of the respective oil lines 150, 160 is connected to respective 'tee' fittings 152, 162 to feed both respective actuators 120, 130 simultaneously. During an extension cycle, oil flows via oil line 150, tee fitting 152 where the paths diverge into oil line 154 to port 126 on a base end of the actuator 120 and into oil line 156 to port 136 on a base end of the actuator 130. The extension cycle is activated by moving the door lever 64 to the 'OPEN' position denoted by the letter 'O' marked on the stack valve 58. During a retraction cycle, oil flows via oil line 160, tee fitting 162 where the paths diverge into oil line 164 to port 128 on the rod end of the actuator 120 and into oil line 166 to port 138 on the rod end of the actuator 130. The retraction cycle is activated by moving the door lever 64 to the 'CLOSE' position denoted by the letter 'C' marked on the stack valve 58. Thus, as oil is pumped into oil line 150 to extend the actuators 120, 130 the bifold doors 20, 22 and 16, 18 are opened. Similarly, as oil is pumped into oil line 160 to retract the actuators 120, 130 the bifold doors 20, 22 and 16, 18 are closed.

Installed near the first end of actuator 120 is a proximity switch 170, installed in a port in the cylinder body of the actuator 120. The proximity switch 170 includes a sensing element (not shown)coupled to a pair of normally closed ('NC') contacts (not shown). The sensing element, for example, may be a magnet (not shown) within the proximity switch and attached or otherwise coupled to one of the contacts. The rod portion of the actuator is terminated in an iron piston at the inside end of the rod. The magnet responds to the proximity of the piston within the actuator 120. In the illustrative example, the proximity switch 170 is placed in the port of the actuator so that, when the rod portion is in the fully retracted or 'rest' position corresponding to the safety door it controls being in a fully closed condition, the contacts of the proximity switch 170 are held closed by the internal magnet. As the door lever 64 is moved to the OPEN position, the oil pressure in the cylinder portion of the actuator 120 increases and forces the piston and rod to move away from its rest (fully retracted) position. The movement of the piston and rod is sensed by the sensing element in the proximity switch 170, causing the contacts in the proximity switch 170 to open.

The proximity switch 170 is positioned on the actuator 120 such that the contacts in the proximity switch 170 open when the piston has moved to extend the overall length of the actuator 120 by a predetermined amount, in a typical embodiment of approximately five percent (5%) or less of the overall, extended length of the actuator 120. This predetermined amount is only an approximation—an initial setting subject to experimentation in the particular case— and may vary substantially with the geometry of the safety door, the hopper body, the actuator used and the tolerances thereof. In the illustrative embodiment, for example, the contacts open when the piston has moved approximately ⅜" from its rest position. This corresponds with limiting the distance to about one to four inches (e.g., to prevent a person inserting an arm through the door opening) that the safety door is allowed to open before the powered implement(s) is disabled. The overall stroke of the actuator in the illustrative embodiment is 13 inches. In other applications, the location of the port for the proximity switch in the cylinder body of the actuator may be specified to the manufacturer to meet the requirements of a particular application.

It will also be understood that, while the proximity switch is installed in the hydraulic actuating cylinder that opens and closes the safety door in the illustrated embodiment, in other applications a proximity switch may be installed elsewhere. For example, a proximity switch may be installed on the rim of the hopper body (or the edge of a door panel) and configured to respond to a magnet on the edge of a door to be opened (or the rim of the hopper body). In such cases, the contacts in the proximity switch may be adjusted to open when the edge of a door panel and the rim of the hopper body become separated by a distance in the range of, for example, one to four inches. This predetermined distance is approximate and subject to the results of experimentation in the particular application. The determination of this distance may also be in consideration of bending or distortion of the door panel structure. It is understood that the amount the door panel is separated from the hopper body to cause interruption in the movement of the rotating or powered implement is limited to a range of separation, at a location along the periphery of the door panel where a person may most likely attempt to gain entry into the hopper body, that prevents the person, or an arm or leg of the person, from entering the hopper body or reaching into the hopper body to the vicinity of the rotating or powered implement.

The proximity switch 170 has at least two terminals or leads. In the illustrative embodiment proximity switch 170 has a first lead 172 connected to a first terminal 114 of the solenoid coil 112 of the dump safety valve 110 and a second lead 174 connected to a ground terminal 176. Connected between the terminal 116 of the solenoid coil 112 and the positive terminal 188 of a battery 182 is a wire 184, an ON/OFF switch 180 and a wire 186. The battery may be the battery of the vehicle carrying the hopper body 12, e.g., a 12 VDC battery. Accordingly, the solenoid coil 112 of the dump safety valve 110 would also be rated at the same voltage, 12VDC. Other voltages may be employed, of course, as long as the solenoid voltage rating is consistent with the available supply voltage. A fuse may be inserted in the wire 184. The ON/OFF switch 180, which serves to activate the door safety system of the present invention, may be part of a vehicle ignition switch or a stand alone switch. Thus, when the door lever 64 is in a CLOSED position, the safety door is closed, the ON/OFF switch 180 is closed, and the safety door system is activated. If the door lever 64 is moved from the CLOSED position to the OPEN position, the proximity switch senses the movement of the rod in the actuator 120 and opens the circuit of the solenoid 112 of the dump safety valve 110, diverting the oil supply from the conveyor and agitator motors 70, 80 to stop the rotation of the rotating implements within the hopper body.

Figure 2A:
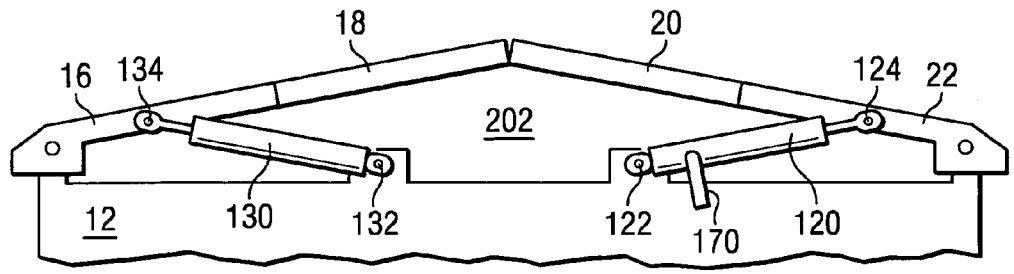
FIG. 2A illustrates an end view of the hopper body of the embodiment of FIG. 1 shown with the safety doors in a fully closed position.
Figure 2B:
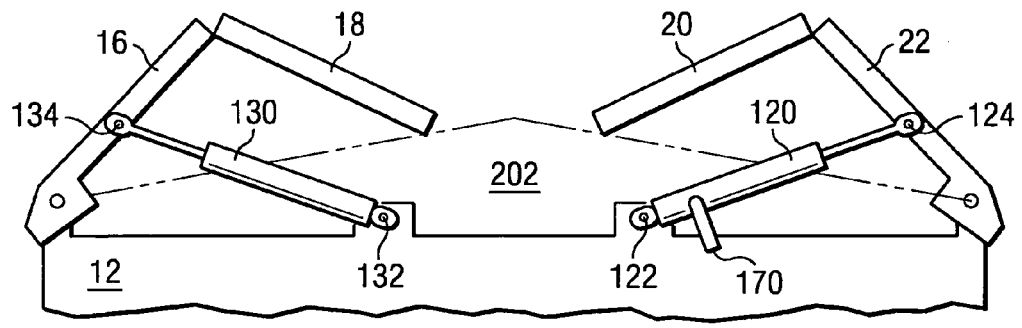
FIG. 2B illustrates an end view of the hopper body of the embodiment of FIG. 1 shown with the safety doors in a partially opened position.
Figure 2C:
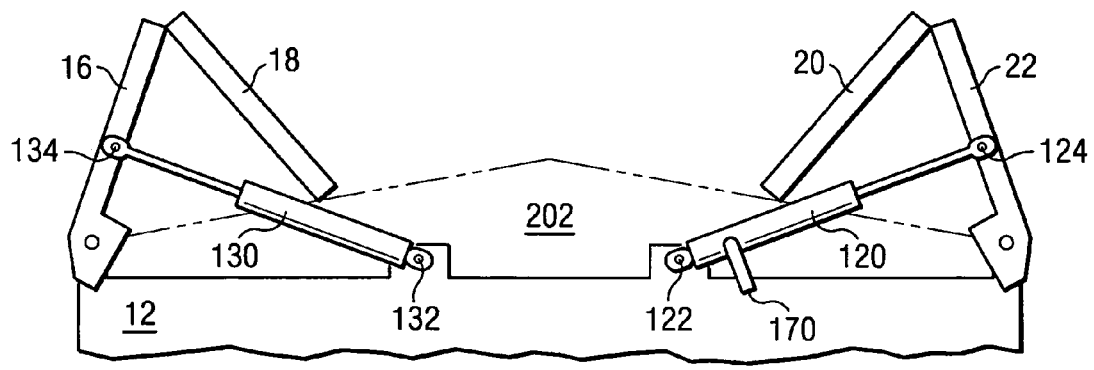
FIG. 2C illustrates an end view of the hopper body of the embodiment of FIG. 1 shown with the safety doors in a more fully opened position.

The movement of the bifold doors 16, 18 and 20, 22 is illustrated in FIGS. 2A, 2B and 2C described herein below, wherein the same reference numbers are used to identify the same structures as shown in FIG. 1.

Referring to FIG. 2A, there is illustrated an end view of the hopper body 12 with the bifold safety doors 16, 18 and 20, 22 of the embodiment of FIG. 1 shown in a fully closed position. In this case, the actuators 120, 130 are de-energized and in their fully retracted position, the contacts of the proximity switch 170 are closed, the solenoid 112 is energized, and the dump safety valve 110 is also closed. In FIG. 2B, there is illustrated an end view of the hopper body 12 with the bifold safety doors 16, 18 and 20, 22 of the embodiment of FIG. 1 shown in a partially opened position corresponding to actuators 120, 130 having been partially filled with oil. In this case, the actuators 120, 130 are partially extended, the contacts of the proximity switch 170 are open, the solenoid is de-energized or released, the dump safety valve 110 is open, diverting oil away from the conveyor motor 70 and the agitator motor 80, which stops the rotating implements. The outline of the rim of the hopper body 12 is shown in a broken line. In FIG. 2C, there is illustrated an end view of the hopper body 12 with the bifold safety doors 16, 18 and 20, 22 of the embodiment of FIG. 1 shown in a more fully opened position, with the actuators 120, 130 nearly fully extended. Here, the conditions of the door safety system are the same as in FIG. 2B.

Figure 3:
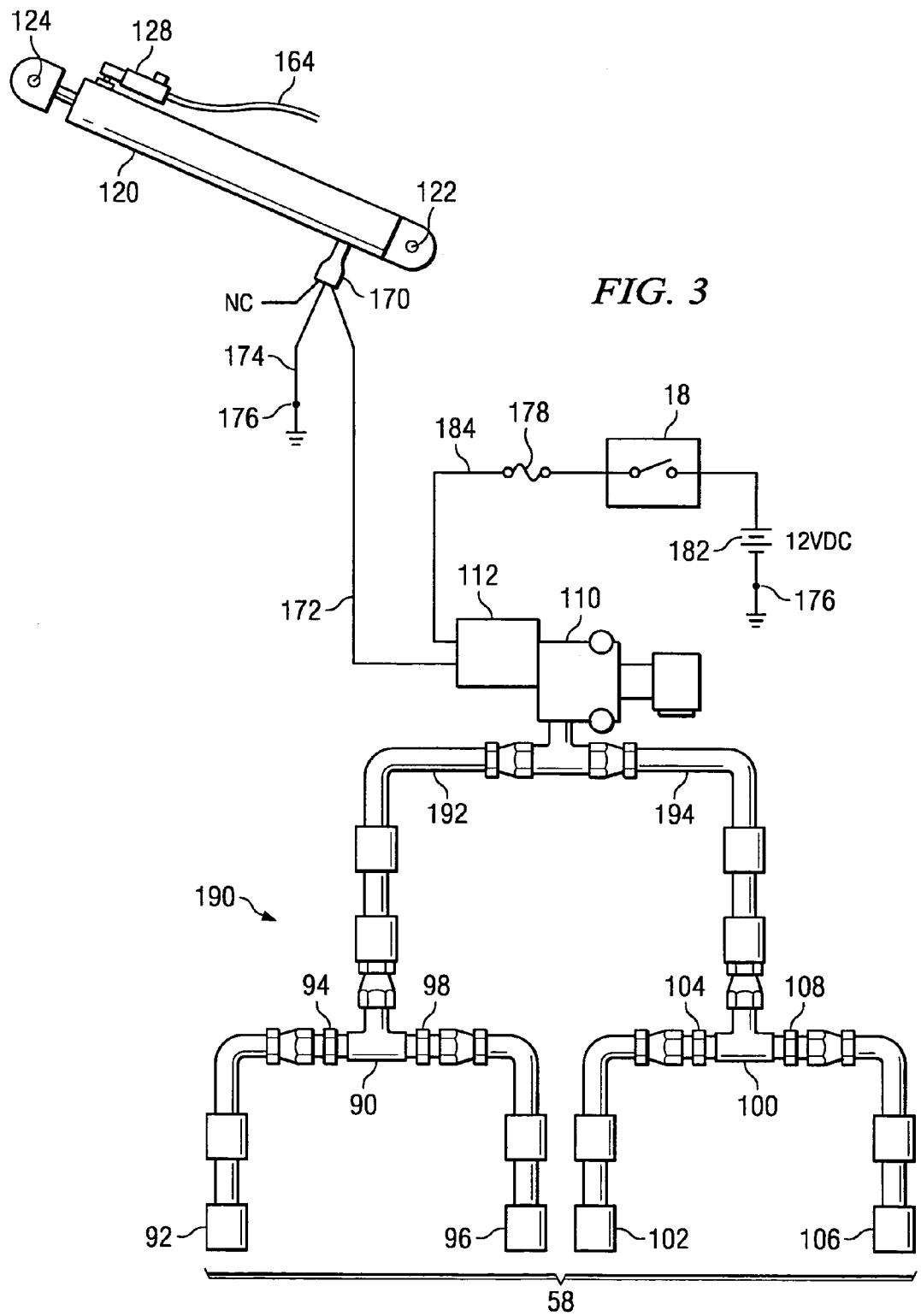
FIG. 3 illustrates a portion of the control apparatus for operating the safety door system of the embodiment of FIG. 1 according to the present invention.

Referring to FIG. 3, there is illustrated an enlarged pictorial view of the bypass circuit 190 portion of the hydraulic system 40 for operating the safety door system of the embodiment of FIG. 1 according to the present invention. Most of the structures of FIG. 3 are illustrated in FIG. 1 and like elements bear like reference numbers. FIG. 3 also shows the oil lines 192, 194 coupling the respective conveyor and agitator bypass circuits to the dump safety valve 110. A hydraulic flow control valve at port 128 on the actuator 120 is also shown in FIG. 3. The actual physical location of each of the structures of FIG. 3, as in FIG. 1, is not shown; rather, FIG. 3 is intended to show the relationship of the components with each other. For example, the solenoid 112 that controls the safety dump valve 110 may be located remotely to the stack valve 58 or other structures (because it needs only electrical wiring connections and has no oil lines connecting to it), or, it may be part of the stack valve 58. The latter configuration is preferred because it saves space and provides a neater installation with no increase in cost, in the illustrative application of FIGS. 1 through 4.

Figure 4:
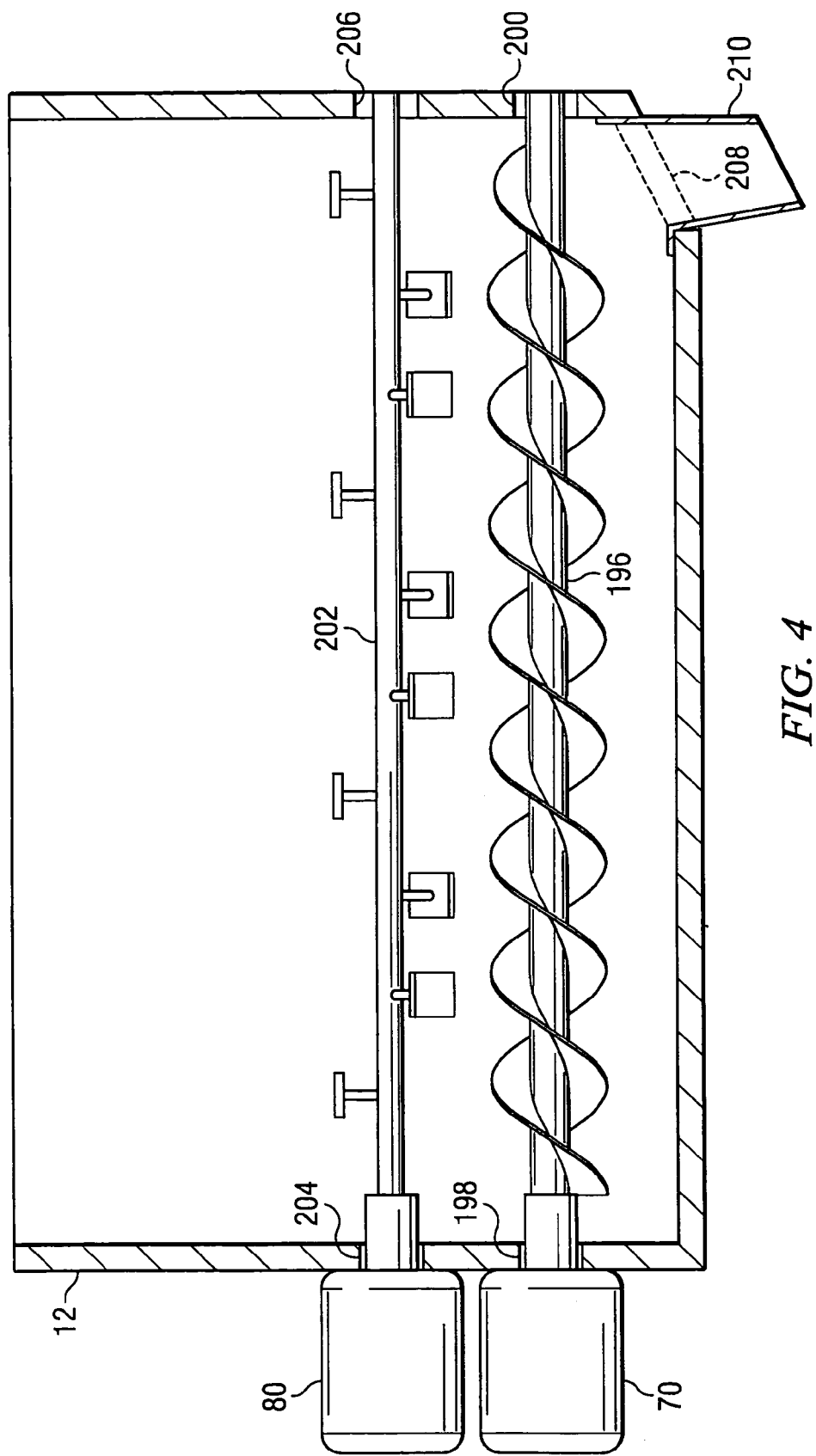
FIG. 4 illustrates a side cross-sectional view along a vertical centerline of the hopper body of the embodiment of FIG. 1 showing one configuration of rotating implements that may be used in the hopper body.

Referring to FIG. 4, there is illustrated a side cross-sectional view along a vertical centerline of the hopper body 12 of the embodiment of FIG. 1 showing one configuration of powered or rotating implements that may be used in the hopper body. An auger configured as a screw conveyer 196 is supported in bearings 198, 200 in the end walls of the hopper body 12 and driven by conveyor motor 70. A paddle shaft configured as an agitator 202 is supported in bearings 204, 206 in the end walls of the hopper body 12 above the screw conveyor 196 and driven by agitator motor 80. Included in a lower portion of the hopper body 12 is an outlet opening 208 and a dispensing chute 210 from which viscous liquid or granular material such as an asphalt mix is dispensed from the hopper body by the screw conveyor 196 following agitation as necessary by the paddle shaft 202 during a pothole patching operation. In some embodiments, other powered implements such as conveyor belts, stirring rods, chopping or cutting blades, metering and dispensing apparatus, and the like, which may all be powered by hydraulic motors, may be used within the hopper body 12.

While the invention has been shown in only one of its forms, it is not thus limited but is susceptible to various changes and modifications as described herein above without departing from the spirit thereof.

What is claimed is:

1. A safety door system, for a hopper body containing a powered implement powered by a hydraulic motor in a hydraulic control system, comprising:
    a hopper body having a V-shaped floor for transporting liquid or granular materials, and further including a powered implement for dispensing the liquid or granular materials from an opening in the hopper body or for agitating the liquid or granular materials;
    a safety door for covering and preventing access into the hopper body during use, hinged along a first edge to a corresponding first side of the hopper body and moveable between a closed and an open position;
    a hydraulic actuating cylinder coupled between a second edge of the safety door and a corresponding second side of the hopper body and operative to open the safety door when the hydraulic actuating cylinder extends its length and to close the safety door when the hydraulic actuating cylinder retracts its length; and
    an interlock device coupled between the hydraulic actuating cylinder and the hydraulic control system comprising:
    a solenoid-operated, normally open dump valve coupled in a supply path of hydraulic fluid to the hydraulic motor and operable to divert the flow of hydraulic fluid from the supply path to a fluid reservoir; and
    a proximity switch coupled to the hydraulic cylinder such that contacts in the proximity switch operate the solenoid-operated, normally open dump valve before the hydraulic cylinder has extended its length by more than a predetermined amount as the door panel is opened wherein
    the powered implement within the hopper body is prevented from operating whenever the safety door is not in a substantially closed position.

2. The safety door system of claim 1, wherein the powered implement is a rotating screw conveyor for dispensing the liquid or granular materials from an opening in the hopper body.

3. The safety door system of claim 2, wherein the screw conveyer is driven by a first hydraulic motor and mounted in the bottom of the hopper body for dispensing the liquid or granular materials from an outlet disposed in a lower-most portion of the V-shaped floor.

4. The safety door system of claim 1, wherein the powered implement is a rotating paddle shaft for agitating the liquid or granular materials.

5. The safety door system of claim 3, wherein the paddle shaft is driven by a second hydraulic motor and located above the screw conveyor in the hopper body for agitating the liquid or granular materials.

6. The safety door system of claim 1, wherein the liquid or granular materials include asphalt mix for repairing potholes in pavements.

7. The safety door system of claim 1, wherein the hopper body is configured for transport on a truck chassis.

8. The safety door system of claim 1, wherein the safety door system comprises a bifold door having first and second panel pairs operated respectively by first and second hydraulic cylinders.

9. The safety door system of claim 1, wherein the safety door system comprises at least a single door panel operated by at least a single hydraulic cylinder.

10. The safety door system of claim 1, wherein the safety door system comprises a multiple panel door operated by at least one hydraulic cylinder.

11. The safety door system of claim 1, wherein the hydraulic cylinder changes its length in a direction approximately orthogonal to a radius arm formed by the door panel that pivots about the hinged first edge of the door panel as the door panel is opened or closed.

12. The safety door system of claim 1, wherein the interlock device causes interruption in the flow of hydraulic fluid to the hydraulic motor operating the rotating implement.

13. The safety door system of claim 12, wherein the predetermined amount is less than approximately ten percent.

14. The safety door system of claim 12, wherein the predetermined amount does not exceed approximately four inches.

15. The safety door system of claim 1, wherein the liquid or granular materials include magnesium chloride mixtures for conditioning icy road surfaces.

16. The safety door system of claim 1, wherein the liquid or granular materials include agricultural materials for seeding crops or conditioning the soil.

17. A safety door system, for a hopper body containing a powered implement powered by a hydraulic motor in a hydraulic control system, comprising:
    a hopper body having a V-shaped floor for transporting liquid or granular materials, and further including a powered implement for dispensing the liquid or granular materials from an opening in the hopper body or for agitating the liquid or granular materials;
    a safety door for covering and preventing access into the hopper body during use, hinged along a first edge to a corresponding first side of the hopper body and moveable between a closed and an open position;
    a hydraulic actuating cylinder coupled between a second edge of the safety door and a corresponding second side of the hopper body and operative to open the safety door when the hydraulic actuating cylinder extends its length and to close the safety door when the hydraulic actuating cylinder retracts its length; and an interlock device coupled between a predetermined location along an interface between the safety door and the hopper body and the hydraulic control system such that the powered implement within the hopper body is prevented from operating whenever the safety door is not in a substantially closed position against the hopper body;

wherein the interlock device comprises:
a solenoid-operated, normally open dump valve coupled in a supply path of hydraulic fluid to the hydraulic motor and operable to divert the flow of hydraulic fluid from the supply path to a fluid reservoir; and
a proximity switch coupled to the predetermined location on the interface between the safety door and the hopper body such that contacts in the proximity switch operate the solenoid-operated, normally open dump valve before the separation between the safety door and the hopper body has increased by more than a predetermined amount as the door panel is opened to prevent entry by a person or a person's limb into the hopper body.

18. The safety door system of claim 17, wherein the interlock device causes interruption in the flow of hydraulic fluid to the hydraulic motor operating the powered implement.

* * * * *